(12) United States Patent
Blumenfeld et al.

(10) Patent No.: US 12,118,473 B2
(45) Date of Patent: Oct. 15, 2024

(54) STATISTICALLY-REPRESENTATIVE SAMPLE DATA GENERATION

(71) Applicant: Clover Health, Jersey City, NJ (US)

(72) Inventors: Ian Blumenfeld, San Francisco, CA (US); Brian Johnson, San Francisco, CA (US)

(73) Assignee: Clover Health, Jersey City, NJ (US)

(*) Notice: Subject to any disclaimer, the term of this patent is extended or adjusted under 35 U.S.C. 154(b) by 1470 days.

(21) Appl. No.: 16/208,029

(22) Filed: Dec. 3, 2018

(65) Prior Publication Data

US 2020/0175383 A1    Jun. 4, 2020

(51) Int. Cl.
| | |
|---|---|
| *G06N 5/02* | (2023.01) |
| *G06F 16/23* | (2019.01) |
| *G06F 16/25* | (2019.01) |
| *G06N 5/025* | (2023.01) |
| *G06N 7/01* | (2023.01) |

(52) U.S. Cl.
CPC ........... *G06N 5/02* (2013.01); *G06F 16/2379* (2019.01); *G06F 16/252* (2019.01); *G06N 5/025* (2013.01); *G06N 7/01* (2023.01)

(58) Field of Classification Search
CPC .......... G06N 5/02; G06N 5/025; G06N 7/005; G06N 3/0454; G06N 3/088; G06F 16/2379; G06F 16/252
See application file for complete search history.

(56) References Cited

U.S. PATENT DOCUMENTS

| | | | | |
|---|---|---|---|---|
| 10,327,105 | B1* | 6/2019 | White | H04W 4/06 |
| 10,460,235 | B1* | 10/2019 | Truong | G06F 11/3608 |
| 11,049,500 | B2* | 6/2021 | Olabiyi | G10L 15/22 |
| 11,105,942 | B2* | 8/2021 | Alwon | G01V 1/282 |
| 11,386,117 | B2* | 7/2022 | Freund | H04L 67/1095 |
| 11,614,434 | B2* | 3/2023 | Buzdin | G16B 25/00 |
| | | | | 424/9.2 |
| 2006/0129427 | A1* | 6/2006 | Wennberg | G06Q 10/00 |
| | | | | 703/2 |
| 2009/0324060 | A1 | 12/2009 | Sato et al. | |
| 2011/0314011 | A1 | 12/2011 | Buehrer et al. | |
| 2013/0046560 | A1 | 2/2013 | Theus et al. | |
| 2013/0301915 | A1* | 11/2013 | Terrazas | G06V 20/13 |
| | | | | 382/173 |

(Continued)

OTHER PUBLICATIONS

The PCT Search Report and Written Opinion mailed on Feb. 5, 2020 for PCT Application No. PCT/US19/62252, 11 pages.

*Primary Examiner* — Kakali Chaki
*Assistant Examiner* — Ababacar Seck
(74) *Attorney, Agent, or Firm* — Lee & Hayes, P.C.

(57) ABSTRACT

Systems and methods for statistically-representative sample data generation are disclosed. For example, a sample-data generator and/or a data discriminator may be received by a system, which may utilize the sample-data generator to generate sample data. The data discriminator may be utilized to train the sample-data generator until the data discriminator cannot discriminate between data received from the sample-data generator and data received by a database associated with the system. The trained sample-data generator may be sent to other systems, which may generate and utilize, such as for prediction model training, statistically-representative sample data generated by the trained sample-data generator.

20 Claims, 7 Drawing Sheets

(56) References Cited

U.S. PATENT DOCUMENTS

| | | | |
|---|---|---|---|
| 2014/0245337 A1* | 8/2014 | Gildfind | H04N 21/44224 |
| | | | 725/16 |
| 2014/0279745 A1* | 9/2014 | Esponda | G06N 5/043 |
| | | | 706/12 |
| 2015/0154441 A1 | 6/2015 | Zhang et al. | |
| 2015/0186712 A1* | 7/2015 | Movellan | G06V 10/993 |
| | | | 382/159 |
| 2015/0294070 A1* | 10/2015 | Osband | G06F 16/3344 |
| | | | 705/3 |
| 2017/0091627 A1* | 3/2017 | Terrazas | G06F 16/29 |
| 2017/0262275 A1* | 9/2017 | Mohiuddin | G06N 20/00 |
| 2018/0373994 A1* | 12/2018 | Doucette | G06N 7/08 |
| 2019/0147333 A1* | 5/2019 | Kallur Palli Kumar | |
| | | | G06N 3/0454 |
| | | | 706/25 |
| 2019/0149425 A1* | 5/2019 | Larish | H04L 43/08 |
| | | | 706/16 |
| 2019/0155284 A1* | 5/2019 | Zavesky | G06V 10/764 |
| 2019/0258984 A1* | 8/2019 | Rehman | G06N 3/08 |
| 2019/0335393 A1* | 10/2019 | Ponsard | H04W 16/14 |
| 2019/0378619 A1* | 12/2019 | Meyer | G16H 50/70 |
| 2020/0104707 A1* | 4/2020 | Azadi | G06N 3/045 |
| 2020/0364571 A1* | 11/2020 | Xu | G06N 5/003 |
| 2021/0168044 A1* | 6/2021 | Ogawa | H04L 41/12 |
| 2021/0174424 A1* | 6/2021 | Langdon | G06Q 30/0205 |
| 2021/0406780 A1* | 12/2021 | Lesner | G06K 9/6227 |

\* cited by examiner

700 —

```
┌─────────────────────────────────────────────────────────────────┐
│ Send, from first system to second system, sample-data generator │
│ configured to generate sample data from first data stored in    │
│ association with second system                                  │
│                              702                                │
└─────────────────────────────────────────────────────────────────┘
                                  │
                                  ▼
┌─────────────────────────────────────────────────────────────────┐
│ Send, from first system to second system, data discriminator    │
│ configured to train sample-data generator                       │
│                              704                                │
└─────────────────────────────────────────────────────────────────┘
                                  │
                                  ▼
┌─────────────────────────────────────────────────────────────────┐
│ Receive, at first system and from second system, trained        │
│ sample-data generator, training sample-data generator trained   │
│ based at least in part on data discriminator                    │
│                              706                                │
└─────────────────────────────────────────────────────────────────┘
                                  │
                                  ▼
┌─────────────────────────────────────────────────────────────────┐
│ Cause trained sample-data generator to generate second          │
│ data that is statistically-representative of first data         │
│                              708                                │
└─────────────────────────────────────────────────────────────────┘
```

FIG. 7

STATISTICALLY-REPRESENTATIVE SAMPLE DATA GENERATION

BACKGROUND

Data from disparate sources may typically be aggregated and used. In some instances, data may be siloed and may not be aggregated with other data. Means to utilize siloed data without sharing the data may be desired. Described herein are improvements in technology and solutions to technical problems that can be used to, among other things, increase the availability and use of siloed data without sharing the data.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 7 illustrates a flow diagram of another example process for statistically-representative sample data generation.

DETAILED DESCRIPTION

Figure 1:
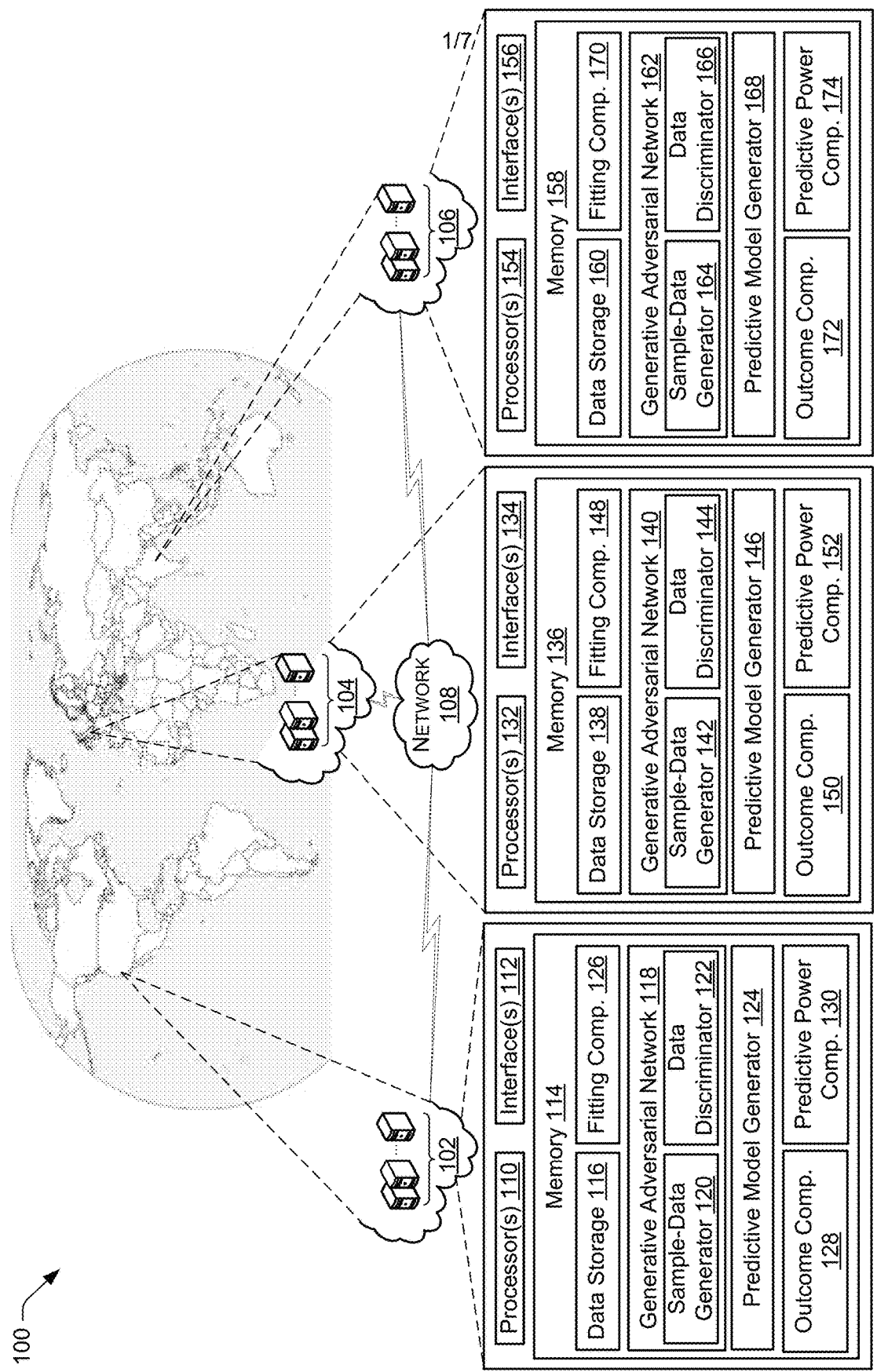
FIG. 1 illustrates a schematic diagram of an example environment for statistically-representative sample data generation.

Systems and methods for statistically-representative sample data generation are described herein. Take, for example, multiple systems that store or otherwise access stored data. Each system may utilize its own data to, for example, predict desired or undesired outcomes. Also, if permitted and desired, the systems may agree to share data such that a given system may use its own data as well as data from other systems to predict outcomes. However, in some examples, data sharing between systems may be prohibited and/or not desired. For example, some governments enact laws and/or regulations that proscribe the sharing of data, such as the sharing of data across country boarders, across state/territory boarders, and/or across company servers. In examples, firewalls may be setup and/or utilized that prevent the sharing of such data. Additionally, or alternatively, given the increased attention data sharing has garnered, companies and/or other entities may desire to silo their data even in the absence of government proscriptions. In these and other examples, the need arises to utilize siloed data without actually sending and/or receiving such data between systems.

The present innovation is directed to systems and methods to generate statistically-representative sample data in a way that allows participating systems to gain the benefits of siloed data without that siloed data being transmitted in a proscribed and/or undesired way. By way of example, a first system and a second system may have siloed data but may desire to utilize each other's data to increase the ability and/or accuracy of predicting a given outcome. For example, the first and second systems may be entities that store and/or have access to health-related information of a number of members. The first and second system may be interested in predicting a certain health-related outcome, such as, for example, a likelihood that a member will be hospitalized.

In the example utilized above, the first system may have access to health-related data associated with its members and the second system may have access to different health-related data associated with its members. On their own, the first system and the second system could utilize their own data to predict a likelihood that a given member and/or set of members will be hospitalized. However, if both systems were able to utilize each other's data, the data sample size would increase and/or different categories of data (e.g., blood pressure, age, medical conditions, living conditions, etc.) would be available to the two systems, which may increase the accuracy of predicting the outcome. To utilize the siloed data from the first and second systems, statistically-representative sample data may be generated and utilized to train a sample-data generator for each system. Once trained the sample-data generators may be exchanged among systems and may be utilized by each system to generate sample data that is statistically representative of the data associated with the other systems. The statistically-representative sample data may be utilized for one or more purposes, such as the training of prediction models to predict the likelihood of an outcome occurring, for example.

By way of example, a first system, which may have access to a first set of data and may be located in a first location, may identify, determine, and/or generate a generative adversarial network (GAN). The GAN may include, in examples, a sample-data generator and/or a data discriminator. The sample-data generator may be configured to access a data record from a database and generate new data having some of the same or similar features as the data record but without other features. For example, a data record may include features such as patient name, patient address, blood pressure values, blood sugar values, and patient age. The sample-data generator may be configured to accept the data record and generate sample data having some of the same features, such as blood pressure values, blood sugar values, and patient age, while not including other features, such as patient name and patient address. The data discriminator may be configured to receive sample data generated by the sample-data generator and analyze that sample data to determine whether the sample data was received from the sample-data generator or from the database storing the data record.

The GAN may be sent from the first system to a second system having access to different data and/or located in a different location than the first system. The GAN may be configured to access data records associated with the second system and generate sample data using the sample-data generator. In examples, differences between the sample data and the data record may be determined by the data discriminator, which may cause the data discriminator to determine that the sample data is received from the sample-data generator instead of the database storing the data record. The identified differences may be utilized by the data discriminator, the sample-data generator, and/or one or more other components of the system to train the sample-data generator. For example, the sample-data generator may be altered and/or updated such that the generated sample data has fewer differences than sample data generated before training. This process may be repeated until the data discriminator cannot determine whether sample data is received from the sample-data generator or the database including the data record. In examples, the process may be repeated until the difference between the sample data and the data record is less than a threshold difference level.

Once the sample-data generator has been trained, the GAN and/or the sample-data generator, as trained, may be sent from the second system to the first system. As such, the only information being sent between systems is the GAN and/or components thereof. No data records associated with the respective systems are being transmitted. The first system, having received the trained sample-data generator, may then utilize the sample-data generator to generate a set of data that is statistically-representative of the data associated with the second system. The statistically-representative data may be stored in the same or a separate database as the data records associated with the first system and may be utilized by one or more components of the first system.

For example, a prediction model configured to determine an outcome and/or a probability of an outcome occurring may be generated and may be trained utilizing at least a portion of the data records available to the first system and/or at least a portion of the sample data generated by the trained sample-data generator. Once trained, the prediction model may be utilized by the first system and/or the prediction model or a variation thereof may be sent to the second system and/or one or more other systems to determine outcomes and/or outcome probabilities with respect to populations associated with the second system.

Additionally, or alternatively, one or more other systems may receive the GAN or a variation thereof and the sample-data generator may be trained based at least in part on the data records available to those systems. Trained sample-data generators may be exchanged among the multiple systems and may be utilized to generate sample-data sets to be utilized by the respective systems.

Additionally, or alternatively, the systems and methods described herein may be configured to determine a relative importance of sample data and/or sample-data generators from other systems. For example, the first system may receive a sample-data generator from another system that produces sample data with a marginal, de minimus improvement in predictive power. In these examples, the system may determine that the information received from the other system is not worth keeping, such as for managing data storage needs. In other examples, the first system may determine that the sample data from a given sample-data generator reduces the predictive power of the first system's predictive model. In these examples, the first system may disregard the information from the other system, such as for performance upkeep. Additionally, or alternatively, in examples, sample data generated utilizing a particular sample-data generator may greatly improve the predictive power of a given predictive model. In these examples, such sample data may be weighted and/or otherwise favored by the predictive model and/or predictive models or other associated systems.

Additionally, or alternatively, the systems and methods described herein may be configured to determine that a given data type (which may be described herein as a feature) is more important and/or useful for predicting a given outcome than one or more other data types. For example, the addition of a given data type, such as a data type associated with sample data generated by an example sample-data generator, may increase the predictive power of the predictive model and/or the removal of a given data type may decrease the predictive power of the predictive model. In these examples, data may be generated that indicates the importance of the given data type. Communications may be sent to associated systems indicating the importance of the given data type, and for systems that are not associated with the data type (e.g., systems that do not collect such information or that have not been configured to analyze such information), they may be configured or reconfigured to collect and/or utilize the data type. By so doing, the predictive power of the predictive models of those systems may be improved. Additionally, or alternatively, a given data type that is determined to be relatively unimportant may be noted and a communication may be sent to associated systems indicating that collection and/or use of data of that data type may cease and/or may not be used by the predictive models of those systems. Additionally, or alternatively, a given system may generate results and/or models that are more useful than results and/or models generated by other systems. The relative importance of a given system to other associated systems may be determined and may be utilized to weight results and/or acquire additional participation by additional systems.

Additionally, or alternatively, the systems and methods described herein may be configured to switch outcomes to predict. Utilizing the example provided above, instead of predicting hospitalizations, one or more of the systems may desire to predict a different outcome, such as a likelihood of being diagnosed with diabetes. In these examples, the system desiring to predict the second outcome may have its predictive model refit for input of data types relevant to predicting the diagnosis of diabetes. Sample-data generators may be configured to generate sample data with features associated with the updated outcome.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment 100 for statistically-representative sample data generation. The environment 100 may include, for example, a first system 102, a second system, 104, and a third system 106. It should be understood that while FIG. 1 depicts three systems, the environment 100 may include two systems, three systems, or more than three systems. It should also be understood that while the objects are described as "systems," those objects may be considered devices. In examples, each of the systems 102, 104, 106 may be located in different locations. As shown in FIG. 1, for example, the first system 102 is located in the United States, the second system 104 is located in England, and the third system 106 is located in India. It should be understood that the systems described herein may be located in any location, and the locations depicted and described herein are by way of illustration only. Additionally, or alternatively, the systems may be located in the same location (e.g., the same address), but may be otherwise physically and/or digitally separated from each other, such as via firewalls. The systems 102, 104, 106 may be configured to communicate with each other via a network 108. The components of the systems 102, 104, 106 will be described in detail below.

For example, the first system 102 may include one or more processors 110, one or more network interfaces 112, and memory 114. The memory 114 may include one or more components, such as, for example, a data storage component 116, a generative adversarial network 118, which may include a sample-data generator 120 and/or a data discriminator 122, a predictive model generator 124, a fitting component 126, an outcome component 128, and/or a predictive power component 130. Each of the components of the memory 114 will be described below.

Additionally, the second system 104 may include one or more processors 132, one or more network interfaces 134, and memory 136. The memory 136 may include one or more components, such as, for example, a data storage component 138, a generative adversarial network 140, which may include a sample-data generator 142 and/or a data discriminator 144, a predictive model generator 146, a fitting component 148, an outcome component 150, and/or a predictive power component 152. Each of the components of the memory 136 will be described below.

Additionally, the third system 106 may include one or more processors 154, one or more network interfaces 156, and memory 158. The memory 158 may include one or more components, such as, for example, a data storage component 160, a generative adversarial network 162, which may include a sample-data generator 164 and/or a data discriminator 166, a predictive model generator 168, a fitting component 170, an outcome component 172, and/or a predictive power component 174. Each of the components of the memory 158 will be described below.

The data storage component 116 may be configured to store and/or access data associated with the first system 102. The data may be any data associated with the first system 102. In examples, the data may be siloed data. As used herein, "siloed data" includes data that is subject to laws, regulations, policies, and/or other restrictions and/or proscriptions that prevents, restricts, and/or proscribes sharing of that data with other systems, entities, and/or countries. Health-related data is used throughout this disclosure as an example of siloed data. However, it should be understood that the use of health-related data is by way of illustration only and not by way of limitation. In examples, the data stored by and/or accessible to a given system in the environment 100 may not be siloed. As such, some data may be siloed while other data may not be siloed. Alternatively, none of the data may be siloed but data aggregation may not be desired. The data storage component 116 may be utilized by one or more other components of the first system 102 to, for example, predict an outcome and/or train a prediction model. The data storage 138 may be configured to store and/or access data associated with the second system 104. The data storage 160 may be configured to store and/or access data associated with the third system 106.

The generative adversarial network (GAN) 118 may be configured to generate sample data and train a sample-data generator to generate statistically-representative sample data. For example, the generative adversarial network 118 may include a sample-data generator 120 and a data discriminator 122. The sample-data generator 118 may be configured to access data records from a database and generate new data having some of the same or similar features as the data record but without other features. For example, a data record may include features such as patient name, patient address, blood pressure values, blood sugar values, and patient age. The sample-data generator 118 may be configured to accept the data record and generate sample data having some of the same features, such as blood pressure values, blood sugar values, and patient age, while not including other features, such as patient name and patient address. The data discriminator may be configured to receive sample data generated by the sample-data generator and analyze that sample data to determine whether the sample data was received from the sample-data generator or from the database storing the data record.

The GAN 118 may be sent from the first system 102 to the second system 104 having access to different data and/or located in a different location than the first system 102. The GAN 118 may be configured to access data records associated with the second system 104 and generate sample data using the sample-data generator 120. In examples, differences between the sample data and the data record may be determined by the data discriminator 122, which may cause the data discriminator 122 to determine that the sample data is received from the sample-data generator 120 instead of the data storage 116 that stores the data record. The identified differences may be utilized by the data discriminator 122, the sample-data generator 120, and/or one or more other components of the system 104 to train the sample-data generator 120. For example, the sample-data generator 120 may be altered and/or updated such that the generated sample data has fewer differences than sample data generated before training. This process may be repeated until the data discriminator 122 cannot determine whether sample data is received from the sample-data generator 120 or the data storage 116. In examples, the process may be repeated until the difference between the sample data and the data record is less than a threshold difference level. It should be understood that while a threshold difference level is described herein, the data discriminator 122 may continue to operate until a measure of statistical difference between sample data and data records reaches a predefined minimum, or in other words, until the sample data is sufficiently similar to the data records.

Once the sample-data generator 120 has been trained, the GAN 118 and/or the sample-data generator 120, as trained, may be sent from the first system to the second system 104 and/or the third system 106. Similarity, the sample-data generator 142 may be trained utilizing the data records available through the data storage 138 with respect to the second system 104. Additionally, the sample-data generator 164 may be trained utilizing the data records available through the data storage 160 with respect to the third system 106. In these examples, the trained sample-data generator 142 may be sent from the second system 104 to the first system 102 and/or to the third system 106. Additionally, or alternatively, the trained sample-data generator 164 may be sent from the third system 106 to the first system 102 and/or to the second system 104. As such, the only information being sent between systems is the GAN 118, 140, and/or 162 and/or components thereof. No data records associated with the respective systems are being transmitted. The first system 102, for example, having received the trained sample-data generator 142 and/or 164, may then utilize the sample-data generator 142 and/or 164 to generate a set of data that is statistically-representative of the data associated with the second system 104 and/or the third system 106. The statistically-representative data may be stored in the same or a separate database, such as the data storage 116, as the data records associated with the first system 102 and may be utilized by one or more components of the first system 102. Likewise, the second system 104, having received the trained sample-data generator 120 and/or 164, may utilize the sample-data generator 120 and/or 164 to generate a set of data that is statistically-representative of the data associated with the first system 102 and/or the third system 106. Further, the third system 106, having received the trained sample-data generator 120 and/or 142, may utilize the sample-data generator 120 and/or 142 to generate a set of data that is statistically-representative of the data associated with the first system 102 and/or the second system 104.

The predictive model generator 124, 146, and/or 168 may be configured to determine an outcome and/or a probability of an outcome occurring may be generated and may be trained utilizing at least a portion of the data records available to the first system 102, the second system 104, and/or the third system 106, respectively, and/or at least a portion of the sample data generated by the trained sample-data generators 120, 142, and/or 164. Once trained, the prediction models may be utilized by the systems 102, 104, and/or 106 and/or the prediction models or variations thereof may be sent between the systems 102, 104, and/or 106 and/or one or more other systems to determine outcomes and/or outcome probabilities with respect to populations associated with the systems.

A predictive model may include one or more models that utilize predictive analytics to predict one or more outcomes. Predictive analytic techniques may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, such as for example the data storage 116, and may be utilized to predict trends and behavior patterns. In examples, the event, otherwise described herein as an outcome, may be an event that will occur in the future, such as whether a member will be hospitalized, a likelihood of a member being diagnosed with diabetes, a likelihood of a member missing a medication prescription fill at a pharmacy, etc. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis, such as from the data storage 116.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models for future events. By so doing, the predictive model generator 124, 146, and/or 168 may utilize data from the data storage 116, 138, and/or 160, as well as sample data as described herein, to predict or otherwise determine an outcome. Outcome prediction may be deterministic such that the outcome is determined to occur or not occur. Additionally, or alternatively, the outcome prediction may be probabilistic such that the outcome is determined to occur to a certain probability and/or confidence.

For example, the first system 102 may generate predictive models, via the predictive model generator 124, based at least in part on at least one of the data to be utilized by the predictive model, the data type of the data to be utilized by the predictive model, the outcome selected to be predicted, and/or one or more specifications of the system indicated to utilize the predictive model. Once generated, the predictive model may be packaged and/or formatted such that it may be transmitted and/or utilized by another system, such as the second system 104 and/or the third system 106. For example, the predictive model may be packaged as a Docker image and may be transmitted to the second system 104 and/or the third system 106 in response to a pull request from the second system 104 and/or the third system 106. Additionally, or alternatively, the predictive model may be pushed to the second system 104 and/or the third system 106 from the first system 104. The packaging may include operating-system-level virtualization, also described as containerization. Resource isolation features of the Linux kernel such as cgroups and kernel namespaces, and a union-capable file system, may be utilized to allow independent containers to run within a Linux instance, which may allow for operations without the use of virtual machines. In other examples, virtual machines may be generated and/or utilized. One or more application programming interfaces (APIs) may be included and may be utilized by a system to predict outcomes with the predictive model.

It should be understood that one of the systems may generate the predictive models and may send those models to the other systems, or the systems may generate their own predictive models using predictive model generators. Additionally, or alternatively, one or more systems may receive the GAN 118, 140, and/or 162 or a variation thereof and the sample-data generators 120, 142, and/or 164 may be trained based at least in part on the data records available to those systems. Trained sample-data generators 120, 142, and/or 164 may be exchanged between the multiple systems and may be utilized to generate sample-data sets to be utilized by the respective systems.

The fitting components 126, 148, and/or 170 may be configured to fit one or more predictive models. Predictive model fitting may be based at least in part on historical data. For example, once an outcome is selected to be predicted, historical data indicating what data and/or data types may be relevant to predicting the outcome may be utilized. The predictive models may be modified and/or otherwise configured, based at least in part on the historical data, to utilize the data and/or data types relevant to the outcome to predict the outcome. Model fitting by the fitting components 126, 148, and/or 170 may include techniques such as linear regression and/or nonlinear regression. Once fit, the predictive model may be sent to other systems and utilized by those systems. The fitting components 126, 148, and/or 170 may also be configured to utilize the sample data generated by the respective systems 102, 104, and/or 106 to train or otherwise fit the predictive models. It should be noted that while the predictive model generators 124, 146, and/or 168 are described as separate components from the fitting components 126, 148, and/or 170, the fitting components 126, 148, and/or 170 may be components of the predictive model generators 124, 146, and/or 168.

The outcome components 128, 150, and/or 172 may be configured to utilize the generated predictive models to predict the selected outcome. For example, data available to the system running the predictive model may be retrieved and input into the predictive model. The outcome components 128, 150, and/or 172 may run the one or more models associated with the predictive model to determine the selected outcome. In examples, the outcome may be deterministic or probabilistic, as described herein.

The result of that analysis may include a determination of the outcome and/or one or more serialized models and/or log files. Serialized models may include translated data structures and/or object states in a format that can be stored and/or transmitted for reconstruction by the receiving system. The serialized object may include a coefficient mapping for common data types between systems as well as a resource configured to allow the receiving system to utilize the coefficient mapping with respect to its data of the common data types. Log files include indications of events that occur in an operating system, such as the resulting prediction from the first system 102 running a prediction model. Features, as described herein, may be an individual measurable property or characteristic of the observed outcome. The feature may be numeric and/or may include one or more strings and/or graphs. In examples, the feature may correspond to an explanatory variable, such as when statistical techniques are utilized when generating and/or utilizing predictive models. The features may be utilized as inputs by the predictive models of each system to predict the outcome, as described herein.

The predictive power components 130, 152, and/or 174 may be configured to determine a relative importance of sample data and/or sample-data generators from other systems. For example, the first system 102 may receive a sample-data generator 142 and/or 164 from another system 104 and/or 106 that produces sample data with a marginal, de minimus improvement in predictive power. In these examples, the system 102 may determine that the information received from the other system 104 and/or 106 is not worth keeping, such as for managing data storage needs. In other examples, the first system 102 may determine that the sample data from a given sample-data generator 142 and/or 164 reduces the predictive power of the first system's predictive model. In these examples, the first system 102 may disregard the information from the other system 104 and/or 106, such as for performance upkeep. Additionally, or alternatively, in examples, sample data generated utilizing a particular sample-data generator 142 and/or 164 may greatly improve the predictive power of a given predictive model. In these examples, such sample data may be weighted and/or otherwise favored by the predictive model and/or predictive models or other associated systems.

Additionally, or alternatively, the predictive power component 130, 152, and/or 174 may be configured to determine that a given data type (which may be described herein as a feature) is more important and/or useful for predicting a given outcome than one or more other data types. For example, the addition of a given data type, such as a data type associated with sample data generated by an example sample-data generator 142 and/or 164, may increase the predictive power of the predictive model and/or the removal of a given data type may decrease the predictive power of the predictive model. In these examples, data may be generated that indicates the importance of the given data type. Communications may be sent to associated systems indicating the importance of the given data type, and for systems that are not associated with the data type (e.g., systems that do not collect such information or that have not been configured to analyze such information), they may be configured or reconfigured to collect and/or utilize the data type. By so doing, the predictive power of the predictive models of those systems may be improved. Additionally, or alternatively, a given data type that is determined to be relatively unimportant may be noted and a communication may be sent to associated systems indicating that collection and/or use of data of that data type may cease and/or may not be used by the predictive models of those systems. Additionally, or alternatively, a given system may generate results and/or models that are more useful than results and/or models generated by other systems. The relative importance of a given system to other associated systems may be determined and may be utilized to weight results and/or acquire additional participation by additional systems.

While certain components are illustrated and described above as specific to a given system, such as the first system 102, it should be understood that some or all of the components may be associated with one or more of the other systems, such as the second system 104 and/or the third system 106. Additionally, operations performed by the processors 110 of the first system 102 may also, or alternatively, be performed by one or more of the processors 132 of the second system 104 and/or one or more of the processors 154 of the third system 106.

As used herein, a processor, such as processor(s) 110, 132, and/or 154, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110, 132, and/or 154 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110, 132, and/or 154 may possess its own local memory, which also may store program components, program data, and/or one or more operating systems.

The memory 114, 136, and/or 158 may include volatile and nonvolatile memory, removable and non-removable media implemented in any method or technology for storage of information, such as computer-readable instructions, data structures, program component, or other data. Such memory 114, 136, and/or 158 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114, 136, and/or 158 may be implemented as computer-readable storage media ("CRSM"), which may be any available physical media accessible by the processor(s) 104 and/or 130 to execute instructions stored on the memory 114, 136, and/or 158. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114, 136, and/or 158, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 112, 134, and/or 156 may enable communications between the components and/or devices shown in environment 100 and/or with one or more other remote systems, as well as other networked devices. Such network interface(s) 112, 134, and/or 156 may include one or more network interface controllers (NICs) or other types of transceiver devices to send and receive communications over the network 108.

For instance, each of the network interface(s) 112, 134, and/or 156 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 112, 134, and/or 156 may include a wide area network (WAN) component to enable communication over a wide area network.

Figure 2:
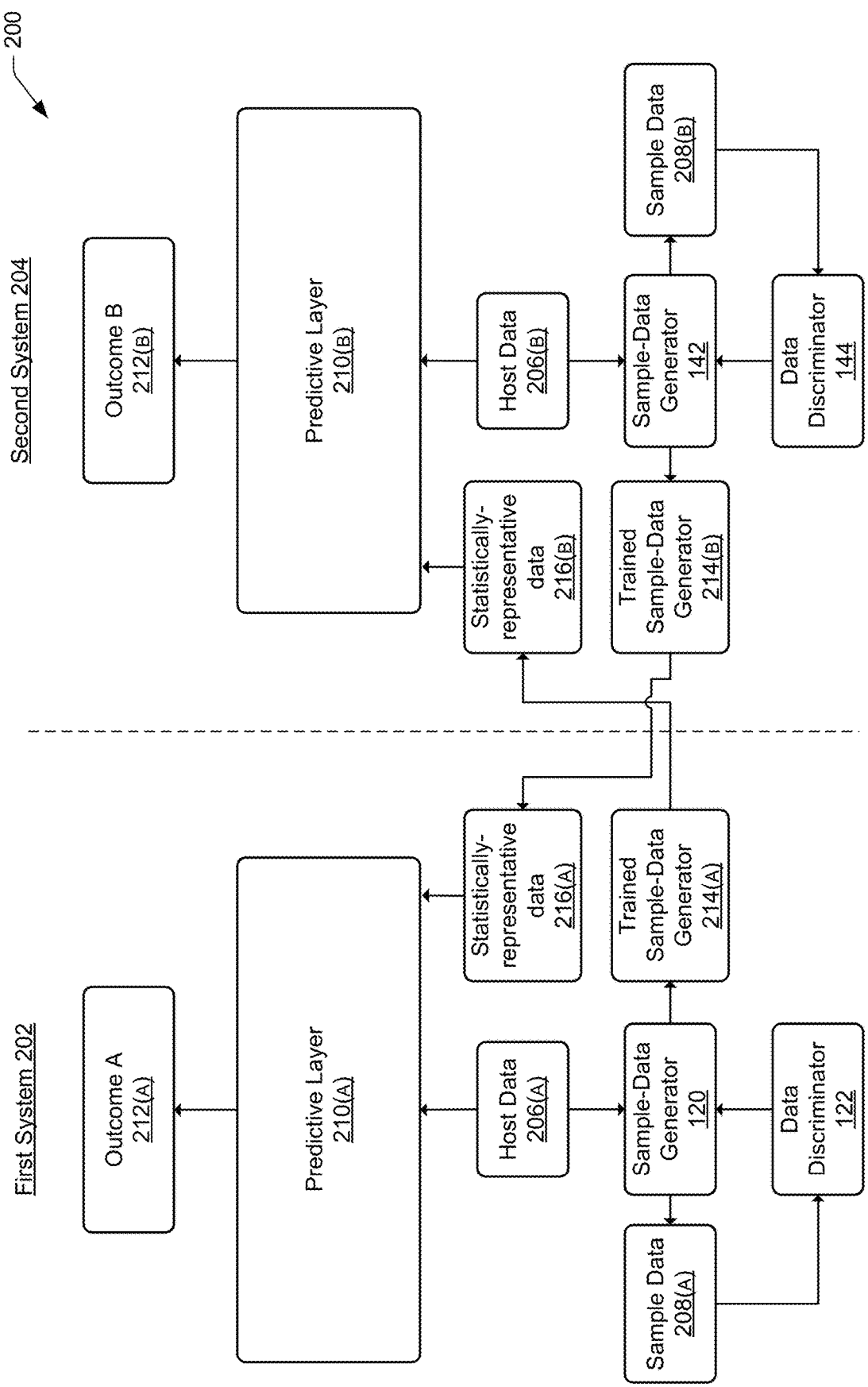
FIG. 2 illustrates a conceptual diagram of example components of two systems utilized for statistically-representative sample data generation.

FIG. 2 illustrates a conceptual diagram of example components and data of two systems utilized for statistically-representative sample data generation. The environment 200 depicted in FIG. 2 shows a first system 202 and a second system 204. The first system 202 may include the same or similar components and perform the same or similar operations as the first system 102 from FIG. 1. The second system 204 may include the same or similar components and perform the same or similar operations as the second system 104 and/or the third system 106 from FIG. 1.

For example, the first system 202 may include a sample-data generator 120, which may have been identified and/or generated by the first system 202 or may have been received from the second system 204. The second system 204 may include a sample-data generator 142, which may have been identified and/or generated by the second system 204 or may have been received from the first system 202.

The sample-data generator 120 may be configured to access data records, which may be referred to as host data 206(*a*) from a database and generate new data having some of the same or similar features as the data record but without other features. For example, a host data 206(*a*) may include features such as patient name, patient address, blood pressure values, blood sugar values, and patient age. The sample-data generator 120 may be configured to accept the host data 206(*a*) and generate sample data 208(*a*) having some of the same features, such as blood pressure values, blood sugar values, and patient age, while not including other features, such as patient name and patient address. The data discriminator 122 may be configured to receive sample data 208(*a*) generated by the sample-data generator 120 and analyze that sample data 208(*a*) to determine whether the sample data 208(*b*) was received from the sample-data generator 120 or from the database storing the host data 206(*a*).

The sample-data generator 120 may be sent from the first system 202 to the second system 204 having access to different data and/or located in a different location than the first system 202. The sample-data generator 120 may be configured to access data records associated with the second system 204 and generate sample data 208(*b*) using the sample-data generator 142. In examples, differences between the sample data 208(*b*) and host data 206(*b*) accessible to the second system 204 may be determined by the data discriminator 144, which may cause the data discriminator 144 to determine that the sample data 208(*b*) is received from the sample-data generator 144 instead of the data storage that stores the host data 206(*a*). The identified differences may be utilized by the data discriminator 144, the sample-data generator 142, and/or one or more other components of the system 204 to train the sample-data generator 142. For example, the sample-data generator 142 may be altered and/or updated such that the generated sample data has fewer differences than sample data generated before training. This process may be repeated until the data discriminator 144 cannot determine whether sample data 208(*b*) is received from the sample-data generator 142 or the data storage where the host data 206(*b*) is stored. In examples, the process may be repeated until the difference between the sample data 208(*b*) and the host data 206(*b*) is less than a threshold difference level. It should be understood that while a threshold difference level is described herein, the data discriminator 142 may continue to operate until a measure of statistical difference between sample data and data records reaches a predefined minimum, or in other words, until the sample data is sufficiently similar to the data records.

Once the sample-data generator 120, 142 has been trained, the trained sample-data generator 214(*a*), 214(*b*), may be sent from the first system 202 to the second system 204 and/or from the second system 204 to the first system 202. In other words, the sample-data generators may be trained using one system's data and then may be sent from that system to one or more other systems. The first system 202, for example, having received the trained sample-data generator 214(*b*), may then utilize the sample-data generator 214(*b*) to generate statistically-representative data 216(*a*) associated with the second system 204. The statistically-representative data 216(*a*) may be stored in the same or a separate database, such as the data storage, as the data records associated with the first system 202 and may be utilized by one or more components of the first system 202. Likewise, the second system 204, having received the trained sample-data generator 214(*a*), may utilize the sample-data generator 214(*a*) to generate statistically-representative data 216(*b*) associated with the first system 202.

A predictive model 210(*a*), 210(*b*) may be generated and/or received, which may be trained based at least in part on the host data 206(*a*), 206(*b*) and/or the statistically-representative sample data 208(*a*), 208(*b*). The predictive models 210(*a*), 210(*b*) may then may utilized to determine an outcome 212(*a*), 212(*b*) and/or determine a probability of an outcome 212(*a*), 212(*b*) occurring, as described more fully with respect to FIG. 1.

It should be understood that while the first system 202 and the second system 204 have been described herein as having host data 206(*a*), 206(*b*), one or more of the systems may not have host data and may not require host data to participate in the processes described herein. For example, the second system 204 may receive the trained sample-data generator 214(*a*) from the first system 202 and may utilize the trained sample-data generator 214(*a*) to generate statistically-representative data 216(*b*) of the first system 202. In these examples, a system may define a population set and may utilize the statistically-representative data that is relevant to that population set for one or more applications, such as predicting an outcome. Additionally, or alternatively, if permitted, an interface may be provided to the second system 204 to access a database of the statistically-representative data 216(*b*) as generated by the trained sample-data generator 214(*a*).

Figure 3:
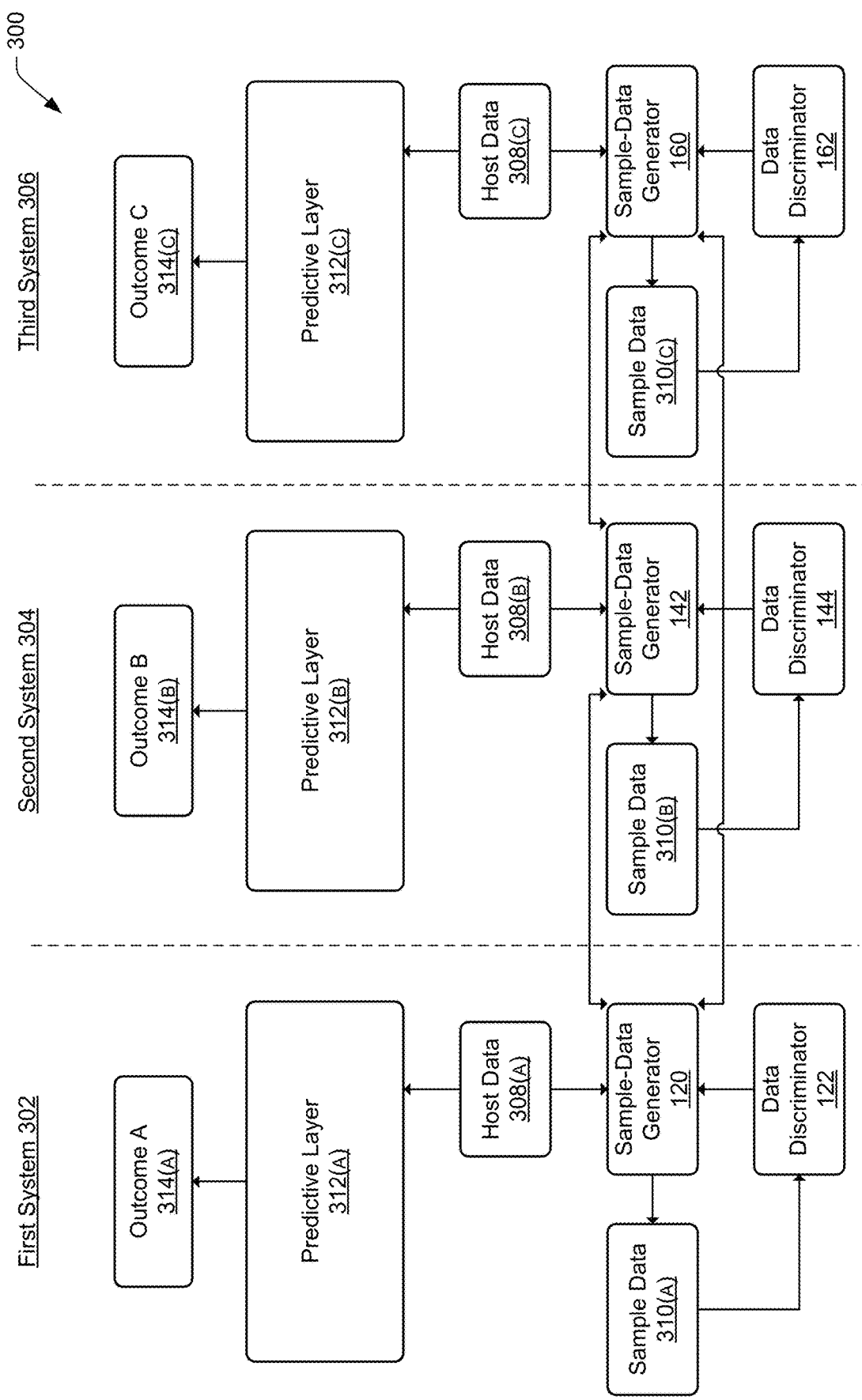
FIG. 3 illustrates a conceptual diagram of example components of three or more systems utilized for statistically-representative sample data generation.

FIG. 3 illustrates a conceptual diagram of example components of three or more systems utilized for statistically-representative sample data generation. The environment 300 depicted in FIG. 3 shows a first system 302, a second system 304, and a third system 306. The first system 302 may include the same or similar components and perform the same or similar operations as the first system 102 from FIG. 1. The second system 304 may include the same or similar components and perform the same or similar operations as the second system 104 from FIG. 1. The third system 306 may include the same or similar components and perform the same or similar operations as the third system 106 from FIG. 1.

For example, the first system 302 may include a sample-data generator 120, which may have been identified and/or generated by the first system 302 or may have been received from the second system 304 or the third system 306. The second system 304 may include a sample-data generator 142, which may have been identified and/or generated by the second system 304 or may have been received from the first system 302 or the third system 306. The third system 306 may include a sample-data generator 164, which may have been identified and/or generated by the third system 306 or may have been received from the first system 302 or the second system 304.

The sample-data generator 120 may be configured to access data records, which may be referred to as host data 308(*a*) from a database and generate new data having some of the same or similar features as the host data 308(*a*) but without other features. For example, host data 308(*a*) may include features such as patient name, patient address, blood pressure values, blood sugar values, and patient age. The sample-data generator 120 may be configured to accept the host data 308(*a*) and generate sample data 310(*a*) having some of the same features, such as blood pressure values, blood sugar values, and patient age, while not including other features, such as patient name and patient address. The data discriminator 122 may be configured to receive sample data 310(*a*) generated by the sample-data generator 120 and analyze that sample data 310(*a*) to determine whether the sample data 310(*a*) was received from the sample-data generator 120 or from the database storing the host data 308(*a*).

The sample-data generator 120 may be sent from the first system 302 to the second system 304 having access to different data and/or located in a different location than the first system 302. The sample-data generator 120 may additionally, or alternatively, be sent from the first system 302 to the third system 306 having access to different data and/or located in a different location than the first system 302 and the second system 304. The sample-data generator 142 may be configured to access data records associated with the second system 304 and generate sample data 310(*b*) using the sample-data generator 142. In examples, differences between the sample data 310(*b*) and host data 308(*b*) accessible to the second system 304 may be determined by the data discriminator 144, which may cause the data discriminator 144 to determine that the sample data 310(*b*) is received from the sample-data generator 144 instead of the data storage that stores the host data 308(*a*). The identified differences may be utilized by the data discriminator 144, the sample-data generator 142, and/or one or more other components of the system 304 to train the sample-data generator 142. For example, the sample-data generator 142 may be altered and/or updated such that the generated sample data has fewer differences than sample data generated before training. This process may be repeated until the data discriminator 144 cannot determine whether sample data 310(*b*) is received from the sample-data generator 142 or the data storage where the host data 308(*b*) is stored. In examples, the process may be repeated until the difference between the sample data 310(*b*) and the host data 308(*b*) is less than a threshold difference level. It should be understood that while a threshold difference level is described herein, the data discriminator 142 may continue to operate until a measure of statistical difference between sample data and data records reaches a predefined minimum, or in other words, until the sample data is sufficiently similar to the data records.

The sample-data generator 160 may be utilized by the third system 306 in the same or a similar manner as the sample-data generator 142 from the second system 304. Additionally, the data discriminator 162 may be utilized by the third system 306 in the same or a similar manner as the data discriminator 144 from the second system 304. The sample-data generator 160 may receive host data 308(*c*) from the database associated with the third system 306 and may generate sample data 310(*c*).

Once the sample-data generator 120, 142, 160 has been trained, the sample-data generator 120, 142, 160 as trained (also described herein as trained sample-data generators), may be sent between the first system 302, the second system 304, and/or to the third system 306. In other words, the sample-data generators may be trained using one system's data and then may be sent from that system to one or more other systems. The first system 302, for example, having received the trained sample-data generator 142, 160 from the second system 304 and the third system 306, may then utilize the sample-data generator 142, 160 to generate a set of data that is statistically-representative of the data associated with the second system 304 and the third system 306. The statistically-representative data may be stored in the same or a separate database, such as the data storage, as the host data 308(*a*) associated with the first system 302 and may be utilized by one or more components of the first system 302. Likewise, the second system 304, having received the trained sample-data generator 120, 160, may utilize the sample-data generator 120, 160 to generate a set of data that is statistically-representative of the data associated with the first system 302 and the third system 306.

A predictive model 312(*a*), 312(*b*), 312(*c*) may be generated and/or received, which may be trained based at least in part on the host data 308(*a*), 308(*b*), 308(*c*) and/or the statistically-representative sample data 310(*a*), 310(*b*), 310(*c*). The predictive models 312(*a*), 312(*b*), 312(*c*) may then may utilized to determine an outcome 314(*a*), 314(*b*), 314(*c*) and/or determine a probability of an outcome 314(*a*), 314(*b*), 314(*c*) occurring, as described more fully with respect to FIG. 1.

It should be understood that while trained sample-data generators are described with respect to FIG. 3 as being transferred between the multiple systems, this disclosure also includes the trained sample-data generators being transmitted from the multiple systems to one, primary system. The primary system may generate statistically-representative data using the trained sample-data generators, and may store such data in a database. The multiple systems may access the database upon receiving permission to do so.

FIGS. 4-7 illustrate various processes for statistically-representative sample data generation. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3, although the processes may be implemented in a wide variety of other environments, architectures and systems.

Figure 4:
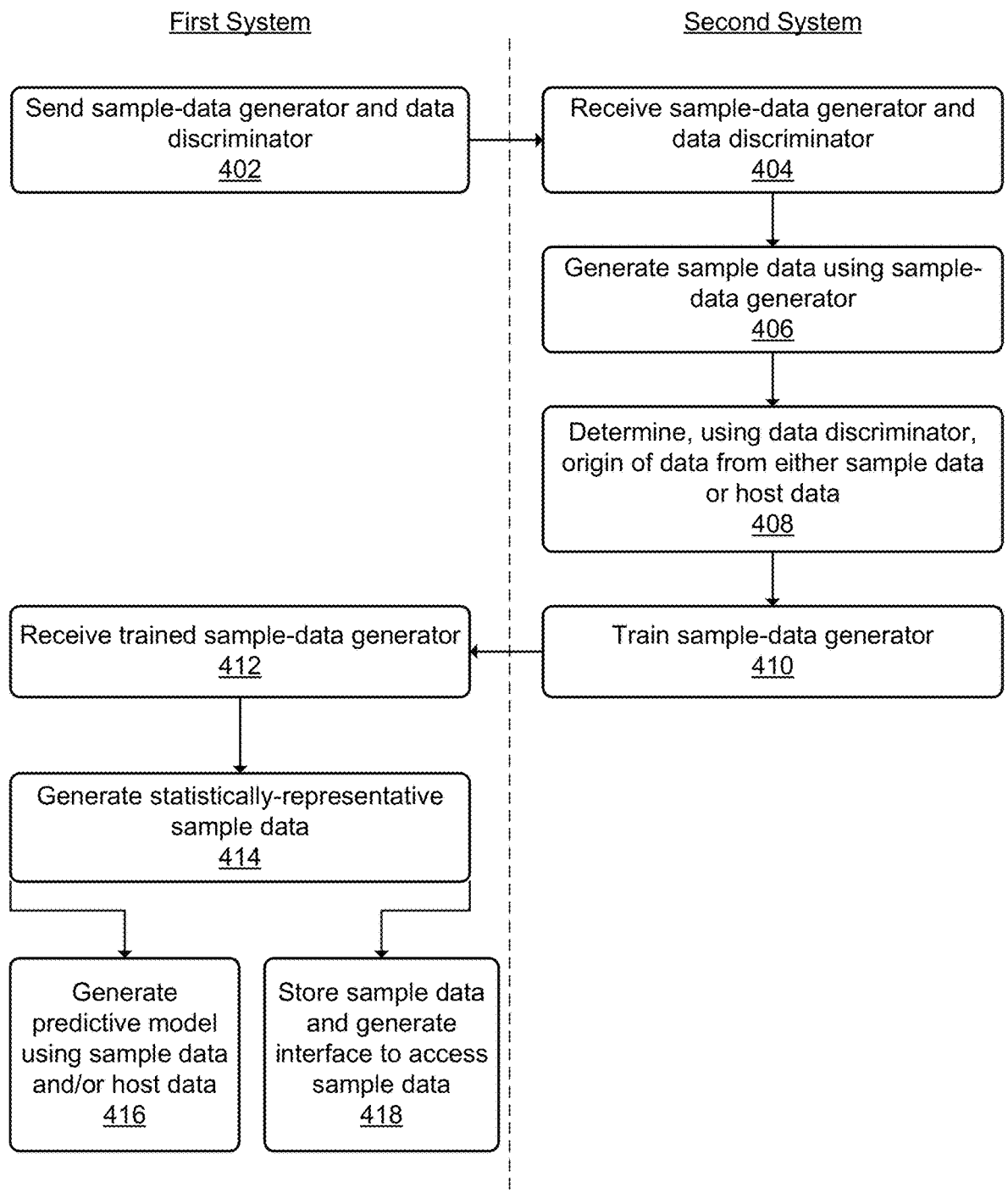
FIG. 4 illustrates a flow diagram of an example process for statistically-representative sample data generation between two systems.

FIG. 4 illustrates a flow diagram of an example process 400 for statistically-representative sample data generation between two systems. The order in which the operations or steps are described is not intended to be construed as a limitation, and any number of the described operations may be combined in any order and/or in parallel to implement process 400. As shown in FIG. 4, the operations described with respect to the process 400 may be performed by a first system and a second system, for example. Example operations performed by each system are shown in FIG. 4.

At block 402, the process 400 may include sending a sample-data generator and a data discriminator from the first system to the second system. The sample-data generator may be configured to access a data record, also described as host data, from a database and generate new data having some of the same or similar features as the data record but without other features. For example, a data record may include features such as patient name, patient address, blood pressure values, blood sugar values, and patient age. The sample-data generator may be configured to accept the data record and generate sample data having some of the same features, such as blood pressure values, blood sugar values, and patient age, while not including other features, such as patient name and patient address. The data discriminator may be configured to receive sample data generated by the sample-data generator and analyze that sample data to determine whether the sample data was received from the sample-data generator or from the database storing the data record. The sample-data generator and/or the data discriminator may be sent as a GAN.

At block 404, the process 400 may include receiving, from the first system and at the second system, the sample-data generator and the data discriminator. For example, the second system may call for the sample-data generator and/or the data discriminator, which may cause the first system to send the sample-data generator and the data discriminator. In other examples, the second system may generate the sample-data generator and/or the data discriminator, and in these examples the sample-data generator and/or the data discriminator may be received from the second system itself.

At block 406, the process 400 may include generating, by the second system, sample data using the sample-data generator. The GAN may be configured to access data records associated with the second system and generate sample data using the sample-data generator.

At block 408, the process 400 may include determining, using the data discriminator, an origin of the data received by the data discriminator from either the sample-data generator (or a database associated with the sample-data generator) or the data storage associated with the second system (the data stored thereon being described herein as host data). For example, differences between the sample data and the data record may be determined by the data discriminator, which may cause the data discriminator to determine that the sample data is received from the sample-data generator instead of the data storage that stores the data record.

At block 410, the process 400 may include training the sample-data generator to create a trained sample-data generator. For example, the identified differences may be utilized by the data discriminator, the sample-data generator, and/or one or more other components of the second system to train the sample-data generator. For example, the sample-data generator may be altered and/or updated such that the generated sample data has fewer differences than sample data generated before training. This process may be repeated until the data discriminator cannot determine whether sample data is received from the sample-data generator or the data storage. In examples, the process may be repeated until the difference between the sample data and the data record is less than a threshold difference level.

At block 412, the process 400 may include receiving, at the first system and from the second system, the trained sample-data generator. For example, once the sample-data generator has been trained, the GAN and/or the sample-data generator, as trained, may be sent from the second system to the first system. As such, the only information being sent between systems is the GAN and/or components thereof. No data records associated with the respective systems are being transmitted.

At block 414, the process 400 may include generating statistically-representative sample data using the trained sample-data generator. The first system, for example, having received the trained sample-data generator, may then utilize the sample-data generator to generate a set of data that is statistically-representative of the data associated with the second system. The statistically-representative data may be stored in the same or a separate database, such as the data storage, as the data records associated with the first system and may be utilized by one or more components of the first system.

At block 416, the process 400 may include generating a predictive model using the sample data and/or the host data associated with the first system. For example, a predictive model generator may be configured to determine an outcome and/or a probability of an outcome occurring may be generated and may be trained utilizing at least a portion of the data records available to the first system, and/or at least a portion of the sample data generated by the trained sample-data generator. Once trained, the prediction model may be utilized by the first system and/or the prediction model or variations thereof may be sent between the systems and/or one or more other systems to determine outcomes and/or outcome probabilities with respect to populations associated with the systems.

At block 418, the process 400 may include storing the sample data and generating an interface to access the sample data. For example, the first system may have no restrictions or fewer restrictions on the sharing of data. In these examples, the generated statistically-representative data may be stored in a database along with, in examples, indications of the origins of the trained sample-data generator associated with the statistically-representative data. An interface, such as an application programming interface may be identified, determined, and/or generated that allows for systems with permission to access and utilize the statistically-representative data.

It should be understood that while the second system is generating sample data and training the sample-data generator, and the first system is generating the statistically-representative data using the trained sample-data generator, these operations may be performed by either the first system or the second system. For example, the sample-data generator may be sent from the second system to the first system, and the first system may utilize the sample-data generator to generate sample data. The first system may also utilize the data discriminator to train the sample-data generator, and the trained sample-data generator may be sent from the first system to the second system. The second system may utilize the trained sample-data generator to generate statistically-representative data and may generate prediction models and/or store the data.

Figure 5:
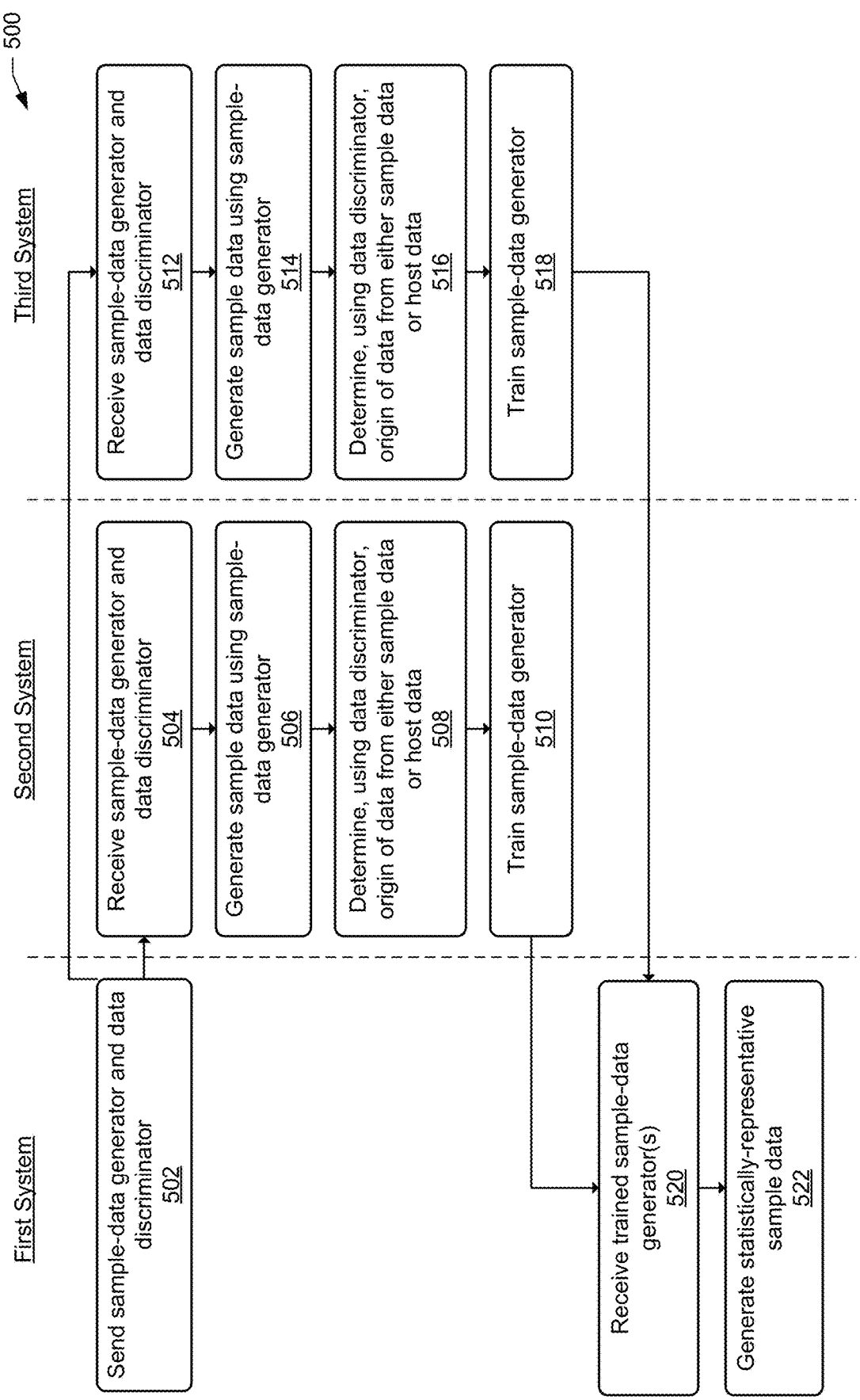
FIG. 5 illustrates a flow diagram of an example process for statistically-representative sample data generation among three or more systems.

FIG. 5 illustrates a flow diagram of an example process 500 for statistically-representative sample data generation among three or more systems. The order in which the operations or steps are described is not intended to be construed as a limitation, and any number of the described operations may be combined in any order and/or in parallel to implement process 500. As shown in FIG. 5, the operations described with respect to the process 500 may be performed by a first system and a second system, for example. Example operations performed by each system are shown in FIG. 5.

At block 502, the process 500 may include sending, from the first system to the second system and/or to the third system, a sample-data generator and a data discriminator. The sample-data generator may be configured to access a data record, also described as host data, from a database and generate new data having some of the same or similar features as the data record but without other features. For example, a data record may include features such as patient name, patient address, blood pressure values, blood sugar values, and patient age. The sample-data generator may be configured to accept the data record and generate sample data having some of the same features, such as blood pressure values, blood sugar values, and patient age, while not including other features, such as patient name and patient address. The data discriminator may be configured to receive sample data generated by the sample-data generator and analyze that sample data to determine whether the sample data was received from the sample-data generator or from the database storing the data record. The sample-data generator and/or the data discriminator may be sent as a GAN.

At block 504, the process 500 may include receiving, at the second system, the sample-data generator and the data discriminator. For example, the second system may call for the sample-data generator and/or the data discriminator, which may cause the first system to send the sample-data generator and the data discriminator. In other examples, the second system may generate the sample-data generator and/or the data discriminator, and in these examples the sample-data generator and/or the data discriminator may be received from the second system itself. Additionally, or alternatively, the second system may receive the sample-data generator and/or the data discriminator from the third system.

At block 506, the process 500 may include generating sample data using the sample-data generator. The GAN may be configured to access data records associated with the second system and generate sample data using the sample-data generator.

At block 508, the process 500 may include determining, using the data discriminator, an origin of data from either the sample-data generator (or a database associated with the sample-data generator) or a data storage associated with the second system (which may store host data available to the second system). For example, differences between the sample data and the data record may be determined by the data discriminator, which may cause the data discriminator to determine that the sample data is received from the sample-data generator instead of the data storage that stores the data record.

At block 510, the process 500 may include training the sample-data generator. For example, the identified differences may be utilized by the data discriminator, the sample-data generator, and/or one or more other components of the second system to train the sample-data generator. For example, the sample-data generator may be altered and/or updated such that the generated sample data has fewer differences than sample data generated before training. This process may be repeated until the data discriminator cannot determine whether sample data is received from the sample-data generator or the data storage. In examples, the process may be repeated until the difference between the sample data and the data record is less than a threshold difference level.

At block 512, the third system may receive the sample-data generator and/or the data discriminator from the first system and/or the second system. Receiving the sample-data generator and/or the data discriminator may be performed in the same or a similar manner as described with respect to block 504.

At block 514, the process 500 may include generating sample data using the sample-data generator. The GAN may be configured to access data records associated with the third system and generate sample data using the sample-data generator.

At block 516, the process 500 may include determining, using the data discriminator, an origin of data from either the sample-data generator (or a database associated with the sample-data generator) or a data storage associated with the host data. For example, differences between the sample data and the data record may be determined by the data discriminator, which may cause the data discriminator to determine that the sample data is received from the sample-data generator instead of the data storage that stores the data record.

At block 518, the process 500 may include training the sample-data generator. For example, the identified differences may be utilized by the data discriminator, the sample-data generator, and/or one or more other components of the third system to train the sample-data generator. For example, the sample-data generator may be altered and/or updated such that the generated sample data has fewer differences than sample data generated before training. This process may be repeated until the data discriminator cannot determine whether sample data is received from the sample-data generator or the data storage. In examples, the process may be repeated until the difference between the sample data and the data record is less than a threshold difference level.

At block 520, the process 500 may include receiving trained sample-data generator(s), such as from the second system and/or from the third system. For example, once the sample-data generator has been trained, the GAN and/or the sample-data generator, as trained, may be sent from the second system to the first system and/or from the third system to the first system. As such, the only information being sent between systems is the GAN and/or components thereof. No data records associated with the respective systems are being transmitted.

At block 522, the process 500 may include generating statistically-representative sample data using the trained sample-data generator(s). The first system, for example, having received the trained sample-data generator(s) from the second system and/or from the third system, may then utilize the sample-data generator(s) to generate a set of data that is statistically-representative of the data associated with the second system and/or the third system, respectively. The statistically-representative data may be stored in the same or a separate database, such as the data storage, as the data records associated with the first system and may be utilized by one or more components of the first system.

It should be understood that while the second system and the third system are generating sample data and training the sample-data generators, and the first system is generating the statistically-representative data using the trained sample-data generators, these operations may be performed by either the first system, the second system, or the third system. For example, the sample-data generator may be sent from the second system or the third system to the first system, and the first system may utilize the sample-data generator to generate sample data. The first system may also utilize the data discriminator to train the sample-data generator, and the trained sample-data generator may be sent from the first system to the second system and/or the third system. The second system and/or the third system may utilize the trained sample-data generator to generate statistically-representative data and may generate prediction models and/or store the data.

Figure 6:
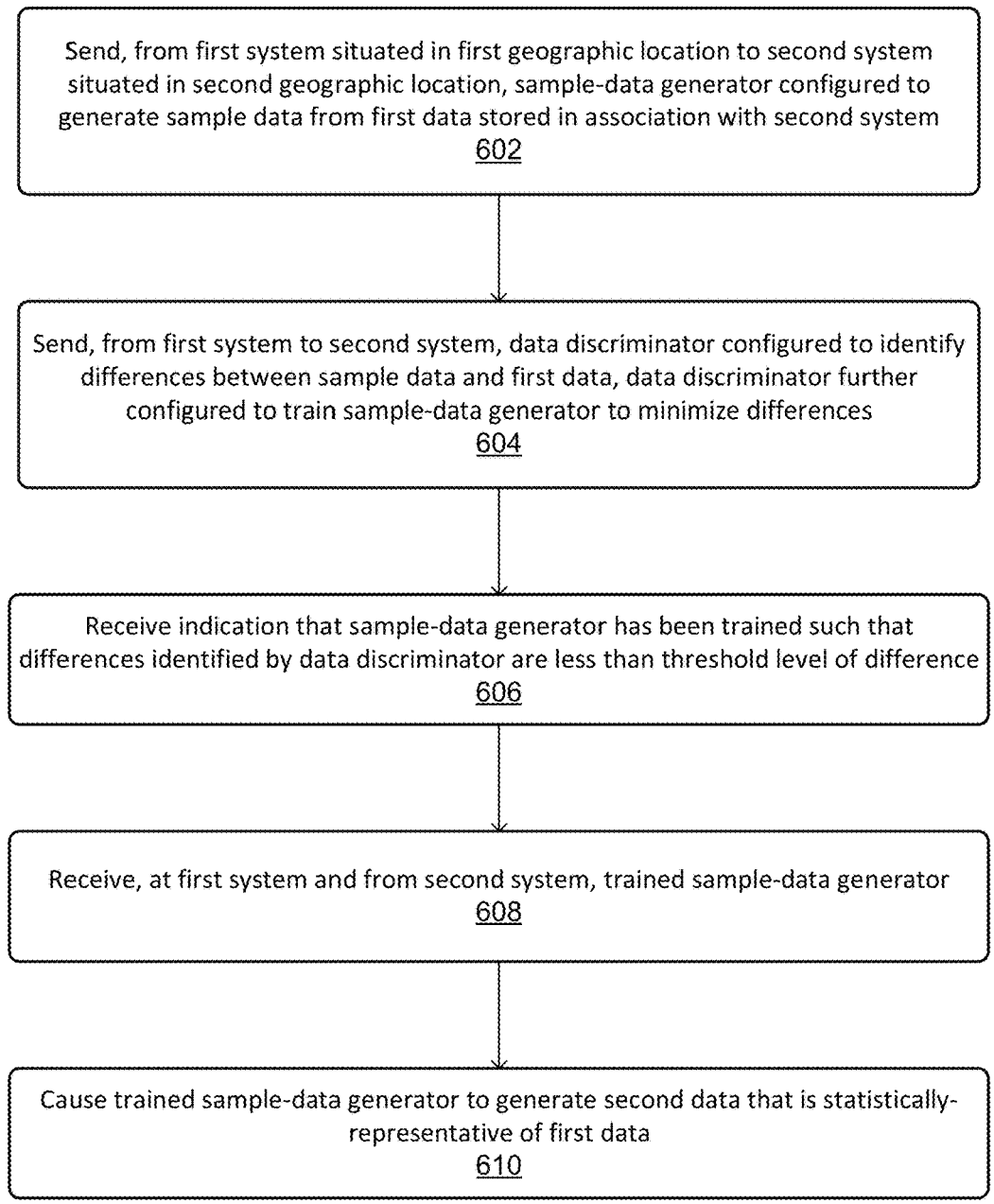
FIG. 6 illustrates a flow diagram of an example process for statistically-representative sample data generation.

FIG. 6 illustrates a flow diagram of an example process 600 for statistically-representative sample data generation. The order in which the operations or steps are described is not intended to be construed as a limitation, and any number of the described operations may be combined in any order and/or in parallel to implement process 600.

At block 602, the process 600 may include sending, from a first system situated in a first geographic location to a second system situated in a second geographic location, a sample-data generator configured to generate sample data from first data stored in association with the second system. The sample-data generator may be configured to access a data record, also described as host data, from a database and generate new data having some of the same or similar features as the data record but without other features. For example, a data record may include features such as patient name, patient address, blood pressure values, blood sugar values, and patient age. The sample-data generator may be configured to accept the data record and generate sample data having some of the same features, such as blood pressure values, blood sugar values, and patient age, while not including other features, such as patient name and patient address.

At block 604, the process 600 may include sending, from the first system to the second system, a data discriminator configured to identify differences between the sample data and the first data, the data discriminator further configured to train the sample-data generator to minimize the differences. The data discriminator may be configured to receive sample data generated by the sample-data generator and analyze that sample data to determine whether the sample data was received from the sample-data generator or from the database storing the data record. The sample-data generator and/or the data discriminator may be sent as a GAN.

At block 606, the process 600 may include receiving an indication that the sample-data generator has been trained such that the differences identified by the data discriminator are less than a threshold level of difference. For example, differences between the sample data and the data record may be determined by the data discriminator, which may cause the data discriminator to determine that the sample data is received from the sample-data generator instead of the data storage that stores the data record. For example, the identified differences may be utilized by the data discriminator, the sample-data generator, and/or one or more other components of the second system to train the sample-data generator. For example, the sample-data generator may be altered and/or updated such that the generated sample data has fewer differences than sample data generated before training. This process may be repeated until the data discriminator cannot determine whether sample data is received from the sample-data generator or the data storage. In examples, the process may be repeated until the difference between the sample data and the data record is less than a threshold difference level.

At block 608, the process 600 may include receiving, at the first system and from the second system, a trained sample-data generator. For example, once the sample-data generator has been trained, the GAN and/or the sample-data generator, as trained, may be sent from the second system to the first system. As such, the only information being sent between systems is the GAN and/or components thereof. No data records associated with the respective systems are being transmitted.

At block 610, the process 600 may include causing the trained sample-data generator to generate second data that is statistically-representative of the first data. The first system, for example, having received the trained sample-data generator, may then utilize the sample-data generator to generate a set of data that is statistically-representative of the data associated with the second system. The statistically-representative data may be stored in the same or a separate database, such as the data storage, as the data records associated with the first system and may be utilized by one or more components of the first system.

The process 600 may additionally, or alternatively, include generating a predictive model configured to determine at least one of an outcome or a probability of the outcome occurring and causing the predictive model to be trained utilizing at least a portion of the second data and at least a portion of third data stored in association with the first system. The process 600 may also include determining the at least one of the outcome or the probability of the outcome occurring using the predictive model, as trained.

The process 600 may additionally, or alternatively, include sending, from the first system to the second system, an instance of the predictive model. In these examples, the instance of the predictive model may be configured to accept the first data associated with the second system.

The process 600 may additionally, or alternatively, include generating a database associated with the first system and storing the second data in a first portion of the database. In these examples, the first portion of the database may indicate that the second data is associated with the second system. The process 600 may also include storing third data associated with the first system in a second portion of the database. The process 600 may also include generating an interface configured to provide selective access to the database or at least one of the first portion or the second portion of the database.

FIG. 7 illustrates a flow diagram of another example process 700 for statistically-representative sample data generation. The order in which the operations or steps are described is not intended to be construed as a limitation, and any number of the described operations may be combined in any order and/or in parallel to implement process 700.

At block 702, the process 700 may include sending, from a first system to a second system, a sample-data generator configured to generate sample data from first data stored in association with the second system. The sample-data generator may be configured to access a data record, also described as host data, from a database and generate new data having some of the same or similar features as the data record but without other features. For example, a data record may include features such as patient name, patient address, blood pressure values, blood sugar values, and patient age. The sample-data generator may be configured to accept the data record and generate sample data having some of the same features, such as blood pressure values, blood sugar values, and patient age, while not including other features, such as patient name and patient address.

At block 704, the process 700 may include sending, from the first system to the second system, a data discriminator configured to train the sample-data generator. The data discriminator may be configured to receive sample data generated by the sample-data generator and analyze that sample data to determine whether the sample data was received from the sample-data generator or from the database storing the data record. The sample-data generator and/or the data discriminator may be sent as a GAN.

At block 706, the process 700 may include receiving, at the first system and from the second system, a trained sample-data generator, the training sample-data generator trained based at least in part on the data discriminator. For example, differences between the sample data and the data record may be determined by the data discriminator, which may cause the data discriminator to determine that the sample data is received from the sample-data generator instead of the data storage that stores the data record. For example, the identified differences may be utilized by the data discriminator, the sample-data generator, and/or one or more other components of the second system to train the sample-data generator. For example, the sample-data generator may be altered and/or updated such that the generated sample data has fewer differences than sample data generated before training. This process may be repeated until the data discriminator cannot determine whether sample data is received from the sample-data generator or the data storage. In examples, the process may be repeated until the difference between the sample data and the data record is less than a threshold difference level.

At block 708, the process 700 may include causing the trained sample-data generator to generate second data that is statistically-representative of the first data. The first system, for example, having received the trained sample-data generator, may then utilize the sample-data generator to generate a set of data that is statistically-representative of the data associated with the second system. The statistically-representative data may be stored in the same or a separate database, such as the data storage, as the data records associated with the first system and may be utilized by one or more components of the first system.

The process 700 may additionally, or alternatively, include generating a predictive model configured to determine at least one of an outcome or a probability of the outcome occurring and causing the predictive model to be trained utilizing at least a portion of the second data and at least a portion of third data stored in association with the first system. The process 700 may also include determining the at least one of the outcome or the probability of the outcome occurring using the predictive model, as trained.

The process 700 may additionally, or alternatively, include sending, from the first system to the second system, an instance of the predictive model. In these examples, the instance of the predictive model may be configured to accept the first data associated with the second system.

The process 700 may additionally, or alternatively, include generating a database associated with the first system and storing the second data in a first portion of the database. In these examples, the first portion of the database may indicate that the second data is associated with the second system. The process 700 may also include storing third data associated with the first system in a second portion of the database. The process 700 may also include generating an interface configured to provide selective access to the database or at least one of the first portion or the second portion of the database.

The process 700 may additionally, or alternatively, include generating a first predictive model configured to determine a probability of an outcome occurring, where the first predictive model is trained utilizing at least a portion of third data associated with the first system. The process 700 may also include determining a first confidence value associated with a first probability of the outcome occurring using the first predictive model. The process 700 may also include generating a second predictive model configured to determine the probability of the outcome occurring, where the second predictive model is trained utilizing at least a portion of the second data. The process 700 may also include determining a second confidence value associated with a second probability of the outcome occurring using the second predictive model and determining that the second confidence value is more favorable than the first confidence value. The process 700 may also include identifying the second system as a priority system based at least in part on the second confidence value being more favorable than the first confidence value.

The process 700 may additionally, or alternatively, include identifying a feature of the second data that is absent from third data associated with the first system. The feature may be a data type associated with the data. The process 700 may also include generating a first predictive model configured to determine a probability of an outcome occurring, where the first predictive model may be trained utilizing a portion of the second data excluding the feature. The process 700 may also include determining a first confidence value associated with a first probability of the outcome occurring using the first predictive model. The process 700 may also include generating a second predictive model configured to determine the probability of the outcome occurring, where the second predictive model may be trained utilizing at least a portion of the second data including the feature. The process 700 may also include determining a second confidence value associated with a second probability of the outcome occurring using the second predictive model and determining that the second confidence value is more favorable than the first confidence value. The process 700 may also include identifying the feature as a priority feature based at least in part on the second confidence value being more favorable than the first confidence value.

The process 700 may additionally, or alternatively, include sending, from the first system to a third system, the sample-data generator and/or the data discriminator, and receiving, at the first system and from the third system, a second trained sample-data generator. The process 700 may also include causing the second trained sample-generator to generate third data that is statistically-representative of fourth data associated with the third system and sending, to the third system, an interface configured to permit access to the second data and the third data.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   computer-readable media storing first computer-executable instructions that, when executed by the one or more processors, cause the one or more processors to perform operations comprising:

sending, from a first component of a first system situated in a first geographic location to a second component of a second system situated in a second geographic location, first instructions to generate sample data from first data stored in association with the second system, the first geographic location being different then the second geographic location and the first component having a first component type that is a same type as a second component type of the second component;

sending, from the first system to the second system, second instructions to identify differences between the sample data and the first data, the second system further configured to train a model to minimize the differences;

receiving an indication that the model has been trained such that the differences are less than a threshold level of difference;

receiving, at the first system and from the second system, a trained model;

causing the trained model to generate second data that is statistically-representative of the first data;

generating a database associated with the first system;

storing the second data in a first portion of the database, the first portion of the database indicating that the second data is associated with the second system;

storing third data associated with the first system in a second portion of the database; and generating an interface configured to provide selective access to the database or at least one of the first portion or the second portion.

2. The system of claim 1, the operations further comprising:
   generating a predictive model configured to determine at least one of an outcome or a probability of the outcome occurring;
   causing the predictive model to be trained utilizing at least a portion of the second data and at least a portion of third data stored in association with the first system; and
   determining the at least one of the outcome or the probability of the outcome occurring using the predictive model as trained.

3. The system of claim 2, the operations further comprising sending, from the first system and to the second system, an instance of the predictive model, the instance of the predictive model configured to accept the first data.

4. The system of claim 1, wherein the database comprises a first database, the operations further comprising:
   receiving the sample data; and
   determining whether the sample data was received from a sample-data generator or from a second database.

5. The system of claim 1, wherein at least one of the sample data, the first data, or the second data is associated with health-related data.

6. The system of claim 5, wherein generating the second data comprises generating a first portion of health-related data and omitting a second portion of health-related data.

7. A method, comprising:
   sending, from a first component of a first system located at a first geographic location to a second component of a second system located at a second geographic location, first instructions to generate sample data from first data stored in association with the second system, the first geographic location being different then the second geographic location and the first component having a first component type that is a same type as a second component type of the second component;

sending, from the first system to the second system, second instructions to train a model;

receiving, at the first system and from the second system, a trained model;

causing the trained model to generate second data that is statistically-representative of the first data;

generating a database associated with the first system;

storing the second data in a first portion of the database, the first portion of the database indicating that the second data is associated with the second system;

storing third data associated with the first system in a second portion of the database; and generating an interface configured to provide selective access to the database or at least one of the first portion or the second portion.

8. The method of claim 7, further comprising:

generating a predictive model configured to determine at least one of an outcome or a probability of the outcome occurring;

causing the predictive model to be trained utilizing at least a portion of the second data and at least a portion of third data stored in association with the first system; and determining the at least one of the outcome or the probability of the outcome occurring using the predictive model as trained.

9. The method of claim 8, further comprising sending, from the first system and to the second system, an instance of the predictive model, the instance of the predictive model configured to accept the first data.

10. The method of claim 7, further comprising:

generating a first predictive model configured to determine a probability of an outcome occurring, the first predictive model trained utilizing at least a portion of third data associated with the first system;

determining a first confidence value associated with a first probability of the outcome occurring using the first predictive model;

generating a second predictive model configured to determine the probability of the outcome occurring, the second predictive model trained utilizing at least a portion of the second data;

determining a second confidence value associated with a second probability of the outcome occurring using the second predictive model;

determining that the second confidence value is more favorable than the first confidence value; and identifying the second system as a priority system based at least in part on the second confidence value being more favorable than the first confidence value.

11. The method of claim 7, further comprising:

identifying a feature of the second data that is absent from third data associated with the first system;

generating a first predictive model configured to determine a probability of an outcome occurring, the first predictive model trained utilizing a portion of the second data excluding the feature;

determining a first confidence value associated with a first probability of the outcome occurring using the first predictive model;

generating a second predictive model configured to determine the probability of the outcome occurring, the second predictive model trained utilizing at least a portion of the second data including the feature;

determining a second confidence value associated with a second probability of the outcome occurring using the second predictive model;

determining that the second confidence value is more favorable than the first confidence value; and identifying the feature as a priority feature based at least in part on the second confidence value being more favorable than the first confidence value.

12. The method of claim 7, wherein the trained model is a component of a generative adversarial network.

13. The method of claim 7, wherein the trained model comprises a first trained model, and the method further comprises:

receiving, at the first system and from a third system, a second trained;

causing the second trained model to generate third data that is statistically-representative of fourth data associated with the third system; and sending, to the third system, an interface configured to permit access to the second data and the third data.

14. A system, comprising:

one or more processors; and computer-readable media storing first computer-executable instructions that, when executed by the one or more processors, cause the one or more processors to perform operations comprising:

sending, from a first component of a first system located at a first geographic location to a second component of a second system located at a second geographic location, first instructions to generate sample data from first data stored in association with the second system, the first geographic location being different then the second geographic location and the first component having a first component type that is a same type as a second component type of the second component;

sending, from the first system to the second system, second instructions to train a model;

receiving, at the first system and from the second system, a trained model;

causing the trained model to generate second data that is statistically-representative of the first data;

generating a database associated with the first system;

storing the second data in a first portion of the database, the first portion of the database indicating that the second data is associated with the second system;

storing third data associated with the first system in a second portion of the database; and generating an interface configured to provide selective access to the database or at least one of the first portion or the second portion.

15. The system of claim 14, the operations further comprising:

generating a predictive model configured to determine at least one of an outcome or a probability of the outcome occurring;

causing the predictive model to be trained utilizing at least a portion of the second data and at least a portion of third data stored in association with the first system; and determining the at least one of the outcome or the probability of the outcome occurring using the predictive model as trained.

16. The system of claim 15, the operation further comprising sending, from the first system and to the second system, an instance of the predictive model, the instance of the predictive model configured to accept the first data.

17. The system of claim 14, the operations further comprising:
- generating a first predictive model configured to determine a probability of an outcome occurring, the first predictive model trained utilizing at least a portion of third data associated with the first system;
- determining a first confidence value associated with a first probability of the outcome occurring using the first predictive model;
- generating a second predictive model configured to determine the probability of the outcome occurring, the second predictive model trained utilizing at least a portion of the second data;
- determining a second confidence value associated with a second probability of the outcome occurring using the second predictive model;
- determining that the second confidence value is more favorable than the first confidence value; and
- identifying the second system as a priority system based at least in part on the second confidence value being more favorable than the first confidence value.

18. The system of claim 14, the operations further comprising:
- identifying a feature of the second data that is absent from third data associated with the first system;
- generating a first predictive model configured to determine a probability of an outcome occurring, the first predictive model trained utilizing a portion of the second data excluding the feature;
- determining a first confidence value associated with a first probability of the outcome occurring using the first predictive model;
- generating a second predictive model configured to determine the probability of the outcome occurring, the second predictive model trained utilizing at least a portion of the second data including the feature;
- determining a second confidence value associated with a second probability of the outcome occurring using the second predictive model;
- determining that the second confidence value is more favorable than the first confidence value; and
- identifying the feature as a priority feature based at least in part on the second confidence value being more favorable than the first confidence value.

19. The system of claim 14, wherein the trained model is a component of a generative adversarial network.

20. The system of claim 14, wherein the trained model comprises a first trained model, and the operations further comprise:
- receiving, at a first system and from a third system, a second trained model;
- causing the second trained model to generate third data that is statistically-representative of fourth data associated with the third system; and
- sending, to the third system, an interface configured to permit access to the second data and the third data.

* * * * *